United States Patent [19]

Scholz

[11] Patent Number: 4,639,687
[45] Date of Patent: Jan. 27, 1987

[54] PHASE CONTROL CIRCUIT

[75] Inventor: Werner Scholz, Gehrden, Fed. Rep. of Germany

[73] Assignee: Telefunken Fernseh und Rundfunk GmbH, Hanover, Fed. Rep. of Germany

[21] Appl. No.: 767,198

[22] PCT Filed: Dec. 1, 1984

[86] PCT No.: PCT/EP84/00381
§ 371 Date: Aug. 12, 1985
§ 102(e) Date: Aug. 12, 1985

[87] PCT Pub. No.: WO85/02731
PCT Pub. Date: Jun. 20, 1985

[30] Foreign Application Priority Data

Dec. 14, 1983 [DE] Fed. Rep. of Germany ....... 3345142

[51] Int. Cl.⁴ ............................................. H03L 7/08
[52] U.S. Cl. ..................................... 331/1 A; 331/25; 331/34
[58] Field of Search ...................... 331/1 A, 20, 25, 34, 331/177 R; 307/511; 328/133; 358/195.1

[56] References Cited

U.S. PATENT DOCUMENTS

| 4,316,152 | 2/1982 | Meyer | 331/1 A |
| 4,543,661 | 9/1985 | Defeuilly et al. | 331/1 A |
| 4,567,447 | 1/1986 | Srivastava et al. | 331/1 A |

FOREIGN PATENT DOCUMENTS

| 0004341 | 10/1979 | European Pat. Off. |
| 2413604 | 9/1975 | Fed. Rep. of Germany |
| 2543171 | 7/1976 | Fed. Rep. of Germany |
| 2745375 | 4/1979 | Fed. Rep. of Germany |

OTHER PUBLICATIONS

EDN, Band 13 Nr. 9, Aug. 1968, "VCO Multiplies Pulse Count Exactly", pp. 72–74.
"Funkschau", 6/83, pp. 61–68 and 7/83, pp. 69–70.

Primary Examiner—Eugene R. LaRoche
Assistant Examiner—Robert J. Pascal
Attorney, Agent, or Firm—Spencer & Frank

[57] ABSTRACT

The invention concerns a phase control circuit and a special digital controlled oscillator. According to the invention the digital controlled oscillator oscillates at two frequencies which are slightly above and slightly below the input frequency.

8 Claims, 7 Drawing Figures

PHASE CONTROL CIRCUIT

BACKGROUND OF THE INVENTION

The invention concerns a phase control circuit (PLL=Phase locked loop) and a special digitally controlled oscillator. Known types of phase control circuits are described for instance in the journal "Funkschau" 6/83 pp 61–68 and 7/83 pp 69, 70.

Digitally controlled oscillators are oscillators in which the frequency is determined by a digital input variable. Such oscillators consist chiefly of a frequency control circuit and are known in various versions (synthesizers).

Particularly high demands are required of phase control circuits which process signals subject to timing errors. In order to remove the timing error it is necessary both to produce clock frequencies which follow the timing error of the signal as closely as possible and also those which do not follow the timing error, and thus form the constant time base for removal of the timing error.

Timing errors are generated in recording devices. The timing errors are measurable with the aid of periodic signals which are recorded alongside the actual information signal. The video signal on a PCM signal contains periodic signals in the form of the synchronization signal or clock signal. For non-periodic analog signals, e.g. audio signals, the recording of an additional pilot frequency is required.

Known types of video recording devices are video disc and video tape recorders. The timing errors of the signals reproduced by these devices possess a particularly strong component with a period corresponding to the rotation period of the read head or the disc. For video signals with a 50 Hz vertical frequency which is common in many home video tape recorders, the period of the timing error is 40 ms. The timing error is 40 ms because in addition to the 50 Hz timing error caused by the head switching, there is also 25 Hz timing error caused by the head adjustment tolerances. With video discs, the timing error caused by eccentricity has a period of 40 or 80 ms, depending on whether 2 or 4 fields are scanned per revolution.

For the measurement and for the removal of timing errors two timing signals are always required. The first timing signal follows the timing error as closely as possible whereas the second timing signal is maintained as free from error as possible, i.e. constant. On the average, both signals must have the same frequency or maintain a fixed frequency ratio, so that e.g. a buffer store used for timing error removal does not overflow.

The first timing signal is obtained by using the timing signal contained in the signal after separation directly or after error removal using a PLL circuit with a low time constant.

The second timing signal is obtained by using a PLL circuit with a very large time constant. The time constant or the low pass filter in the control circuit of the PLL should therefore suppress to a large extent the fundamental frequency of the control voltage obtained with the aid of the phase comparator stage (25 or 12.5 Hz).

The realization of a PLL circuit which suppresses to a sufficient extent such low frequency timing fluctuations has been simplified by the method presented in Federal Republic of Germany Offenlegungsschrift DE-OS No. 27 45 375, published Apr. 19, 1979. According to this method, only short sections of the timing signal subject to timing error are used for the generation of the control voltage in the phase comparator stage, and the time separation of these sections correspond to the period of the timing fluctuations. As a result of this method, the voltage trace at the output of the phase comparator stage is already free of the effects of the timing fluctuations. A substantially reduced time constant is sufficient for the smoothing of the control voltage which is still required. The delay time reduction in the control loop associated with this is to the advantage of the stability of the PLL circuit.

Advances in the digitalization of signal processing allow the introduction of new signal transmission methods. An example of this is the serial transmission of time compressed color signal components as timeplex or MAC signals. Signal stores which can hold a sample consisting of one line are required for time compression and expansion.

It was proposed in Federal Republic of Germany Patent Application No. 33 45 142 that these stores be used at the same time for timing error removal. Thus for instance, the signal derived from a currently available VTR can be transformed into a timing error free timeplex signal. The timing error of the video recorder is particularly difficult because of its sawtooth shape. The lines in which head switching occurs can be significantly too short or too long. The task of error removal consists in so distributing these fluctuations over all the lines of a complete picture that all lines including those in which there is head switching are of the same length.

The effecting of the time compression according to P No. 33 45 142 involves reading the signal which is affected by timing errors into the line store using a first clock which follows the timing fluctuations of the signal as closely as possible. The reading out is then effected using a second clock frequency which is as near as possible constant, and is likewise generated from the signal with the timing errors using a PLL circuit. The ratio between the frequencies of the first and second clock frequencies which correspond to the degree of compression must be exactly maintained on average, so that overflow of the line store is avoided.

The PLL circuit given in DE-OS No. 27 45 375 facilitates the production of the second clock frequency, but this circuit requires a means of filtering in the control voltage generation path. The delay in the control circuit associated with this has a deleterious effect on the stability of the circuit. Because of the long intervals between measurements in the phase comparison stage the tendency towards phase oscillations is particularly great. The poor lock-in behavior requires special measures for providing the right operating condition.

SUMMARY OF THE INVENTION

The invention has the aim of improving and arranging more reliably the provision of a clock frequency which is as constant as possible from a signal which is heavily affected by timing errors.

The objects according to the invention are achieved by a phase control circuit comprising: a frequency controllable oscillator means which is controllable by a correction signal to produce, from an input signal having an input frequency, an output signal which has selected nominal frequency and phase relations to the input frequency; and a phase comparator stage operative for generating the correction signal and connected to the oscillator means for controlling the oscillator means as a function of the correction signal, wherein the correction signal is a digital signal and the oscillator means comprise circuit means operative for causing the frequency of the output signal to selectively vary between a first frequency value which is on average slightly below the frequency value corresponding to the nominal frequency relation and a second frequency value which is on average slightly above the frequency value corresponding to the selected nominal frequency relation. The circuits according to the invention could also be interesting for other applications, since digital circuits are involved.

BRIEF DESCRIPTION OF THE DRAWINGS

The invention is described below with reference to the drawings. These show.

DETAILED DESCRIPTION OF THE PREFERRED EMBODIMENTS

Figure 1:
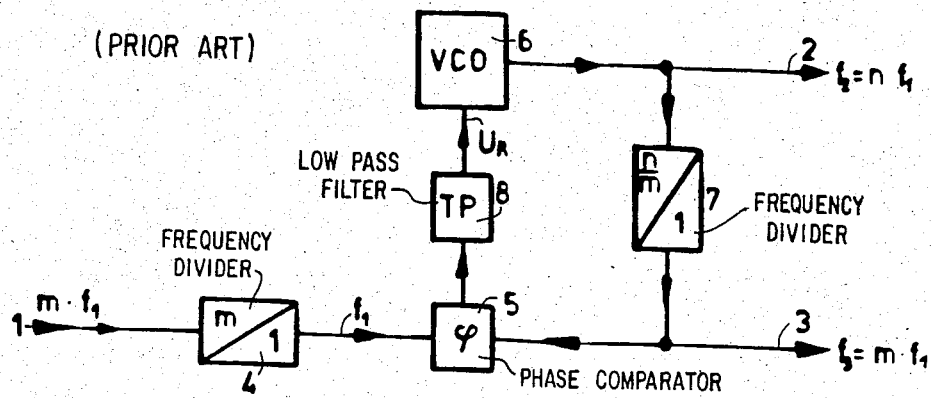
FIG. 1 shows a block diagram of a known type of PLL circuit.

FIG. 1 shows a known type of PLL circuit which produces, for example, from an input frequency $m \cdot f_1$ at the input 1 which is affected by timing errors, the constant frequencies $f_2$ and $f_3$ at the outputs 2 and 3. The fundamental of the timing fluctuation has here a period of m times the period of the input frequency. The input frequency $m \cdot f_1$ is for instance the line frequency of a video signal played back from a video recorder. Then m=625 is the number of lines in a picture and $f_1$ is the picture frequency. $f_2$ is then for instance the clock frequency at which a video signal read into a buffer for the purpose of removal of timing errors is read out again. $f_3$ represents the line frequency of this signal which is read out.

The phase comparison at the phase comparator stage 5 occurs here according to the method described in DE-OS No. 27 45 375. The phase comparison occurs periodically with the period of the timing error, i.e. at a frequency of 25 Hz. The input frequency $m \cdot f_1$ is therefore introduced via the frequency divider 4 to the phase comparator stage 5. The voltage controlled oscillator 6 oscillates at the frequency $f_2$. This frequency is brought to the second input of the phase comparator stage 5 via a second frequency divider 7, which generates the frequency $f_3 = m \cdot f_1$ from the frequency $f_2 = n \cdot f_1$. The phase comparator stage 5 can e.g. consist of a sample and hold circuit. A sawtooth voltage is generated from the frequency $f_3$, and this is sampled by $f_1$. The output voltage of the phase comparator stage is fed to the input of the oscillator 6 via a low pass filter 8 as an analog control voltage. With the practical realization of the circuits described here there occurs the following difficulties:

First, with a large value of m, e.g. m=625, there is a danger that a stable state will be entered with a value different from m. Special measures are required to ensure that the correct value of m is always obtained in the locking process.

Second, in the realization of the phase comparator stage as a sample and hold circuit the greatest possible discharge time constant must be realized with a short charging time constant. A slightly sawtooth shape in the control voltage is unavoidable.

Finally, temperature effects or ageing of components can cause phase changes between $f_1$ and $f_3$ which are not corrected.

Figure 2:
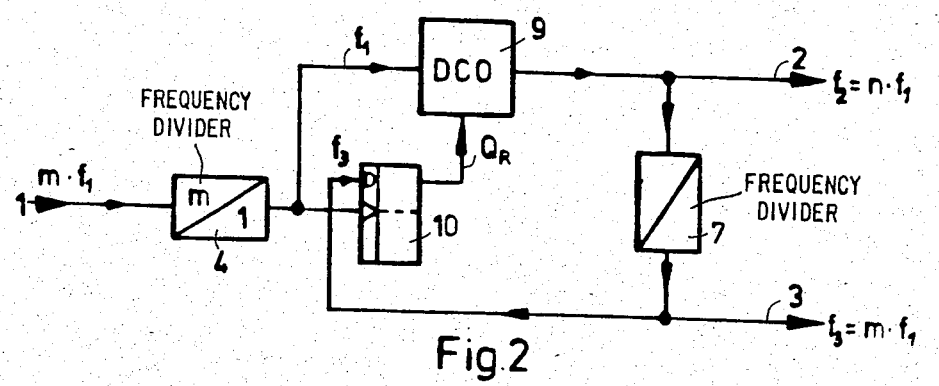
FIG. 2 shows a block diagram of a PLL circuit according to the invention.

The PLL circuit according to the invention shown in FIG. 2 does not exhibit these difficulties. The disadvantages associated with a large m value and the temperature or ageing effects of components are avoided by making the controllable oscillator frequency controlled. The difficulty associated with the sample and hold circuit can not occur since the adjustment of the oscillator frequency for the purpose of phase matching of $f_1$ and $f_3$ is not effected using an analog correcting variable $U_R$ but rather by using a digital variable $Q_R$.

The oscillator 9 of FIG. 2 which is here represented as a digitally controlled oscillator (DCO), is adjustable to two frequency values using the binary input signal $Q_R$. There two frequency values lie at extremely small distances above and below the nominal frequency $f_2 = n \cdot f_1$. Since these slight frequency differences are referred to the input frequency $f_1$, it is necessary to match the oscillator frequency to the input frequency $f_1$ continuously using frequency control. The DCO possesses for this purpose an additional input to which the reference frequency $f_1$ required for the frequency control is fed. The phase comparator stage consists of the D-flip-flop 10 with its output voltage $Q_R$ fed to the DCO as a control voltage.

FIGS. 5A, 5B, 5C, and 5D explain the generation of the binary control voltage $Q_R$ at the DCO 9. FIG. 5A shows the pulse voltage $m \cdot f_1$. This can be formed e.g. from the line pulses of a video signal. The frequency $f_1$ in the second line then represents the video signal picture frequency. The pulse $f_1$ is conveniently derived by frequency division from the line frequency $m \cdot f_1$. Here $m \cdot f_1$ should be taken from a PLL circuit with a low time constant, so that the pulses $m \cdot f_1$ still contain the timing fluctuations of the video signal but are free of pulse interference.

FIG. 5C shows the line frequency $f_3$ derived from the oscillation of the DCO by frequency division. The correction variable $Q_R$ produced with the aid of the D-flip-flop 10 is shown in FIG. 5D. The value of this correction variable for the duration of the next picture depends on the value of the voltages of the oscillation $f_3$ during the rising flank or edge of the $f_1$ pulse. The PLL circuit works perfectly if the timing difference between $f_1$ and $f_3$ is less than the length of half an $f_3$—period, i.e. ½ a line period. By choosing the frequency division ratios this value can easily be matched to the current requirements.

A further advantage of the PLL according to the invention (FIG. 2) relative to the PLL of known type should be pointed out at this point: The frequency $f_1$ should as described above contain as few timing fluctuations as possible. In spite of this, single $f_1$—pulses may exhibit large phase fluctuations. In the PLL of known type, the control voltage $U_R$ and thus the oscillator frequency is proportional to the phase deviation. In the PLL according to the invention not more than one frequency step may be produced. The frequency steps of the DCO can however be chosen so small that no disturbing phase errors are caused by them. The PLL according to the invention is thus less sensitive to pulse disturbances from the input frequency $f_1$.

Figure 3:
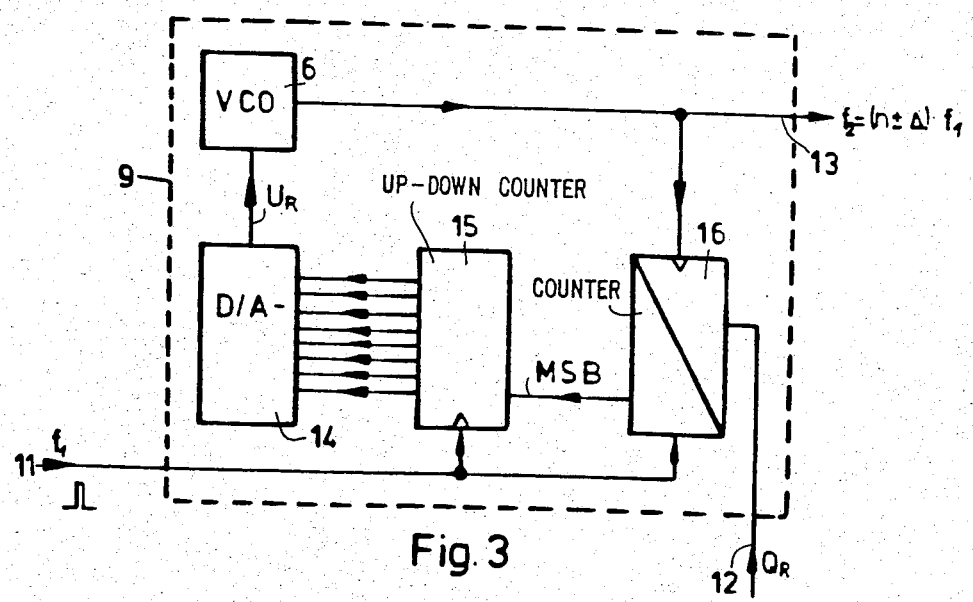
FIG. 3 shows an embodiment for a digital controlled oscillator (=DCO).

FIG. 3 shows an example of the embodiment of the DCO as a digital circuit. This DCO consists of a VCO 6 which obtains its control voltage $U_R$ from the output of a D/A converter 14. The binary number which determines the value of the voltage at the output of the D/A converter is stored in a reversible or up-down counter 15. This reversible counter counts the pulses of the input frequency $f_1$. Here the counting direction is determined in each case by the result of a frequency comparison between $f_1$ and $f_2$ at the output 13. The frequency comparison is effected using the counter 16. Counter 16 counts each $f_1$ pulse from the input 11 such that the Most Significant Bit (MSB) of the counter's binary output signal after $n_1$ or $n_2$ periods of the frequency $f_2$ on its outputs undergoes a level transition from "H" to "L" (FIG. 5E). Whether this level transition occurs after $n_1$ or $n_2$ periods of the frequency $f_2$ is determined by the control voltage $Q_R$ at the input 12. The MSB of the counter 16 determines the counting direction of the reversible or up-down counter 15. In this manner, the duration of the $n_1$ period and the $n_2$ period is changed to produce a phase correction.

Figure 5:
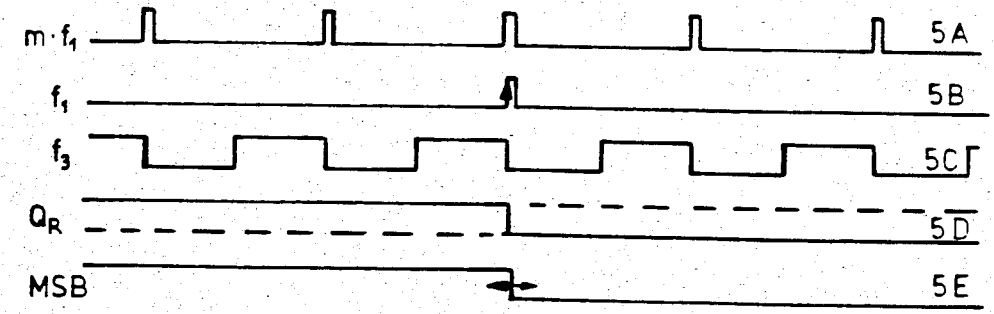
FIG. 5 shows timing signals for the purpose of explaining the mode of operation of the circuits according to FIGS. 2 to 4.

The more exact relationships of this frequency comparison will be explained with reference to the voltage trace shown in FIG. 5 below. As a basis for the dimensioning of a DCO 9 it will be seen firstly that for two adjacent $U_R$-steps:

$$\Delta f_2/f_1 \approx n_2 - n_1$$

For the example the choice made was: $n_1 = n$, $n_2 = n+1$. If the counter is now set to $n_1$ and the MSB of the counter 16 at the time of the $f_1$ pulse is already at "L", then the counter counts up to n between two $f_1$ pulses. If the MSB of the counter 16 during the $f_1$ pulse is at "H" then the counter counts up to n−1 between two $f_1$ pulses. The frequency control works in such a way that on an average these two cases occur with equal frequency. Hence the frequency $f_2$ is set roughly to the value $(n-0.5) \cdot f_1$ when the DCO is set to $n_1 = n$. When the DCO is set to $n_2 = n+1$, $f_2$ is controlled to the value $(n+0.5) \cdot f_1$. Thus this DCO is suitable for the PLL circuit shown in FIG. 2.

The exact dimensioning for the DCO is determined by the requirements of the specific case, e.g. the highest frequency to be generated, the admissible frequency and phase fluctuations, and the available components, e.g. number of stages of the D/A converter, number of stages of the counter, and the frequency stability of the VCO. In an embodiment of the circuit for instance, the oscillator frequency was $1296 \cdot f_H = 20.25$ MHZ. The frequency $f_2$ was $81 \cdot f_H$. It was obtained from the oscillator frequency using an additional frequency divider. In addition $f_1 = f_B = 25$ Hz in this case. By using an 8 bit D/A converter the timing fluctuations of the oscillations generated using a PLL according to FIG. 2 were $\pm 2$ $\mu$S for quench frequencies of 12.5 Hz. With this digital PLL circuit there was practically no difference to be detected between the lock-in region and the hold region. This is evidence of the exceptionally good lock-in behavior of the circuit. In the embodiment of the circuit, the relative values of the lock-in and hold regions were about $7 \cdot 10^{-3}$. This value and also the timing behavior of the circuit can be improved by higher investments in the D/A converter, the divider stages and possibly also a higher quality in the VCO.

Figure 4:
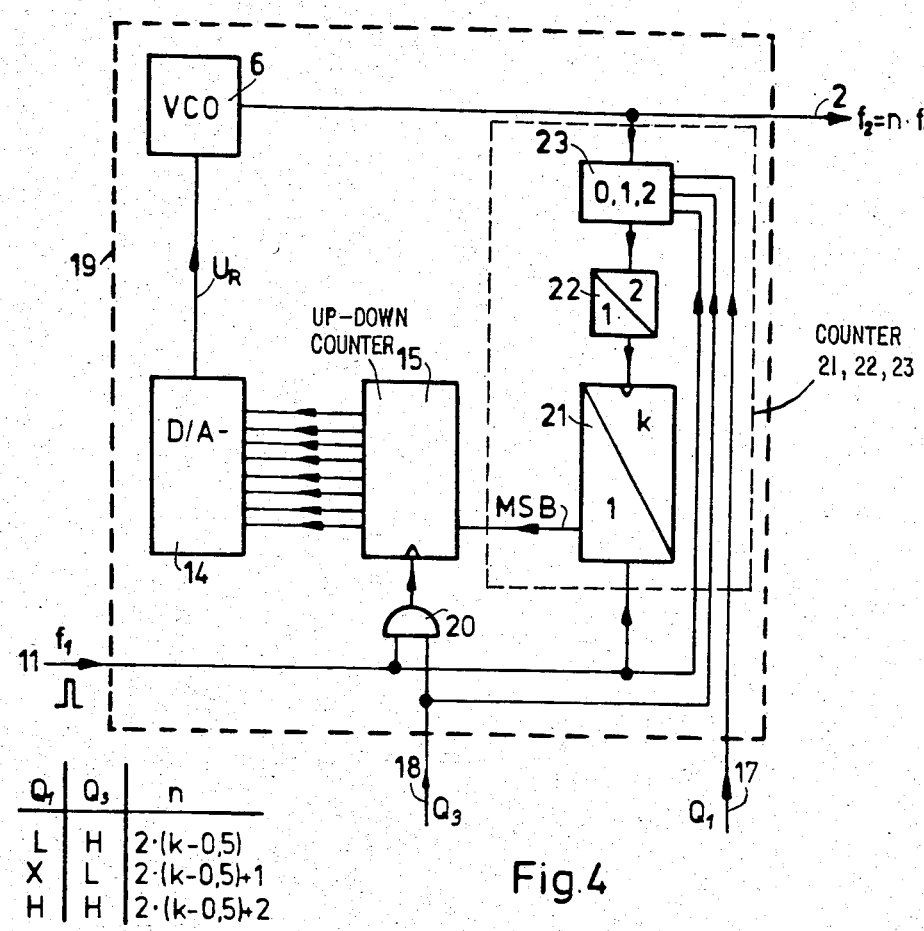
FIG. 4 shows a further embodiment of the DCO.

With the DCO 9, the VCO frequency necessarily changes on each $f_1$ pulse, although it would be advantageous in many cases to maintain the set frequency level. FIG. 4 shows a DCO circuit 19 with the inputs 11, 17, 18 and the output 2 which makes this possible. The gate 20 can prevent the feeding of the $f_1$ pulse to the counter input of the reversible counter 15, when e.g. it is established on two successive phase comparisons in the PLL circuit that the amount of the phase fluctuation is less than a pre-set value.

The adjustment of the counter arrangement 21, 22, 23 for the frequency comparison is indeed without significance, so long as the reversible counter 15 receives no count pulses. It is, however, important that the counting direction of the reversible counter is immediately determined by the first count pulse after the pulse suppression. The count direction can in this case be set by the sense of phase deviation determined in the PLL.

The adjustable counter arrangement 21, 22, 23 for the frequency comparison is so constructed that it is possible to set a third count value with which the DCO frequency would be controlled in the average case to the nominal value $n \cdot f_1$. This average nominal value is set for as long as no counting pulses are fed to the reversible counter, i.e. so long as $Q_3$ is at "L". The MSB of the counter 21 ensures that at the first recurring count pulse, the counting direction of the reversible counter arrangement is set in the sense of the phase correction. The counter for the frequency comparison consists of a fixed up-to-k counter 21, of a frequency divider 22 which divides by 2 and of a stage 23 which, depending on the control signals $f_1$, $Q_1$, $Q_3$, can suppress three different totals of $f_2$−pulses per $f_1$−period. For instance these totals may be 0, 1, 2. The number n, to which the frequency $f_2 = n \cdot f_1$ is controlled in the three different adjustment steps of the DCO is set in dependence on the control signals $Q_1$ and $Q_3$ (see table in FIG. 4). For a frequency control in the center step the blocking by the gate 20 would of course be removed.

Figure 6:
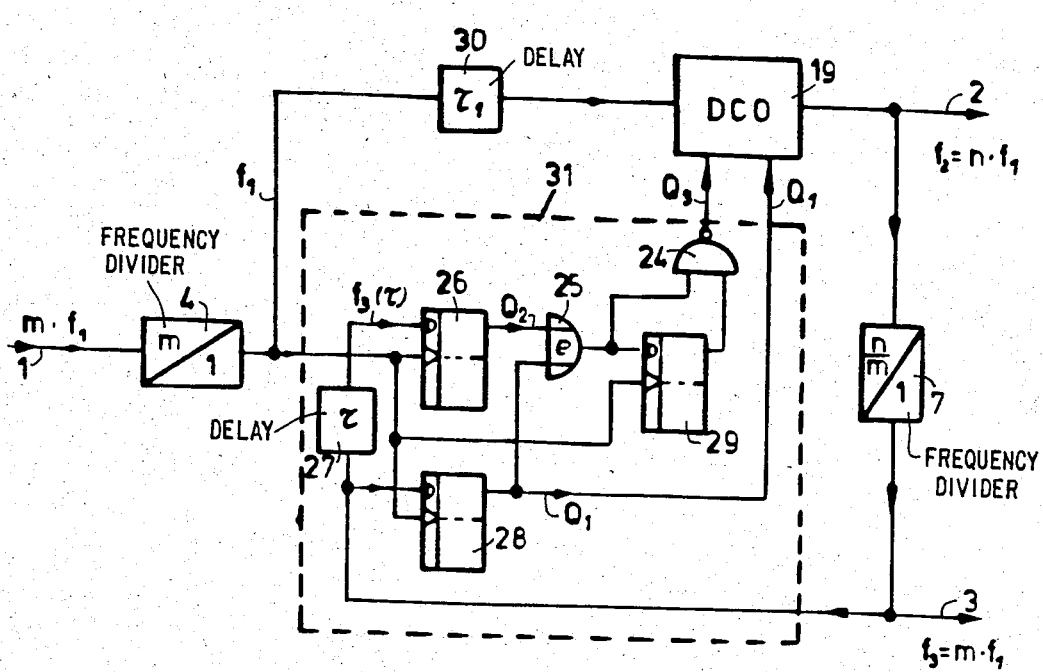
FIG. 6 shows a further embodiment of the PLL circuit according to the invention.

FIG. 6 shows a PLL circuit in accordance with the invention, for which the DCO 19 corresponds e.g. to that of the circuit given in FIG. 4 and for which phase comparator stage 31 supplies the digital output signals $Q_1$ and $Q_3$ for the control of the DCO.

Figure 7:
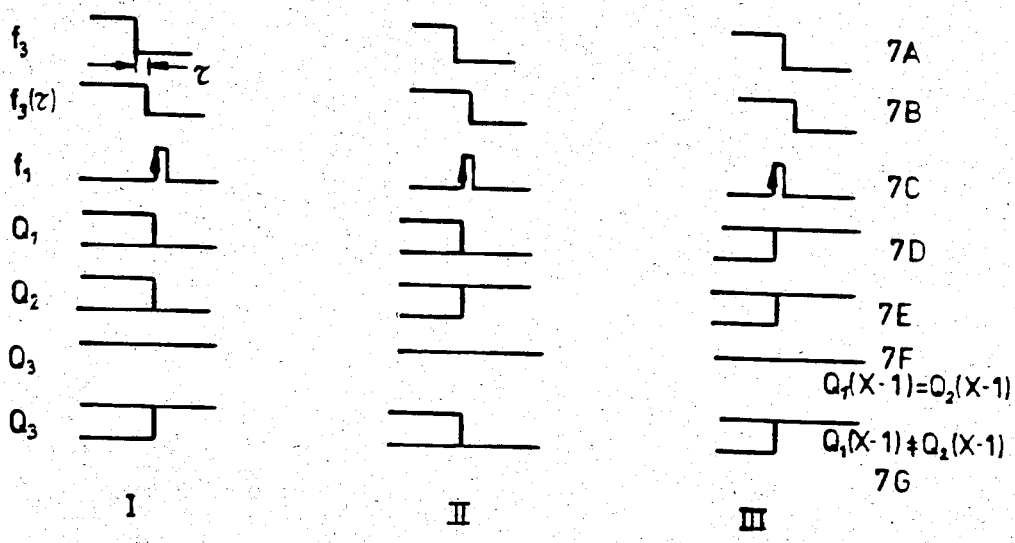
FIG. 7 shows signal traces for the purpose of explaining the circuit according to FIG. 6.

FIG. 7 shows voltage traces which explain the mode of operation of FIG. 6. In columns I and III of FIG. 7 the direction of the phase fluctuation determined by the phase comparator stage is clear. $Q_3$ is "H" after the phase measurement. $Q_1$ sets the frequency of the DCO 19 to a higher or lower value, so that the phase fluctuation is counteracted. In column II the phase fluctuation between $f_3$ and $f_1$ lies within a range the size of which is determined by the delay element 27. The output voltages $Q_1$ and $Q_2$ of the D-flip-flops 26 and 28 take up different values. The output of the XOR gate 25 goes to "H". The corresponding value of the preceding phase comparison is stored in flip-flop 29. If both values are "H" then $Q_3$ at the output of the NAND gate 24 goes to "L". In this case the measures which were described with reference to FIG. 4 are taken in the DCO 19.

In this manner it is possible to reduce further the phase oscillations of the PLL circuit according to the invention which are already small for a sufficiently finely resolving D/A converter.

The delay element 30 serves as a delay equalizer for the phase comparator stage 31.

I claim:

1. A phase control circuit comprising: a frequency controllable oscillator means which is controllable by a correction signal to produce, from an input signal having an input frequency, an output signal which has selected nominal frequency and phase relations to the input frequency; and a phase comparator stage operative for generating the correction signal and connected to said oscillator means for controlling said oscillator means as a function of the correction signal, wherein the correction signal is a digital signal and said oscillator means comprise circuit means operative for causing the frequency of the output signal to selectively vary between a first frequency value which is on average slightly below the frequency value corresponding to the nominal frequency relation and a second frequency value which is on average slightly above the frequency value corresponding to the selected nominal frequency relation.

2. A phase control circuit according to claim 1, characterized in that said oscillator means can be set to more than two frequencies and that the choice of the frequencies is determined by the output signal of said phase comparator stage depending on the value and direction of the phase deviation between input frequency and output frequency.

3. A phase control circuit according to claim 1, characterized in that said oscillator means comprises a control circuit which is constructed of a counter which can be set to different counts, an up-down counter connected to said counter, a digital to analog converter connected to said up-down counter, and a voltage controlled oscillator connected to said digital to analog converter.

4. A phase control circuit according to claim 3, characterized in that said counter is an adjustable counter, said adjustable counter being able to count the pulses of the oscillator frequency, and that the input frequency is connected to the clock input of said adjustable counter thereby allowing the input frequency to control the output of said adjustable counter.

5. A phase control circuit according to claim 3, characterized in that said counter is constructed of a fixed counter at the input of which individual count pulses can be at least one of suppressed and added.

6. Phase control circuit according to claim 4 characterized in that said up-down counter counts the pulses of the input frequency and the counting direction of said up-down counter is determined by the most significant bit of the counter total of said adjustable counter.

7. Phase control circuit according to claim 6, characterized in that individual count pulses can be suppressed at the input of said up-down counter when two successive phase comparisons of said phase comparator stage is less than a pre-set value, and that this process is initiated by digital control signals.

8. Phase control circuit according to claim 3 characterized in that the outputs of the up-down counter are connected to the inputs of the digital to analog converter and the output voltage of the digital to analog converter serves to control the voltage controlled oscillator.

* * * * *